US012380706B2

(12) United States Patent
Guo et al.

(10) Patent No.: US 12,380,706 B2
(45) Date of Patent: Aug. 5, 2025

(54) SYSTEM FOR DETECTING OBSTACLE STATE AND AN OPERATION METHOD THEREOF

(71) Applicant: National Yang Ming Chiao Tung University, Hsinchu (TW)

(72) Inventors: Jiun-In Guo, Hsinchu (TW); Zhe-Lun Hu, Tainan (TW)

(73) Assignee: NATIONAL YANG MING CHIAO TUNG UNIVERSITY, Hsinchu (TW)

(*) Notice: Subject to any disclaimer, the term of this patent is extended or adjusted under 35 U.S.C. 154(b) by 329 days.

(21) Appl. No.: 18/203,385

(22) Filed: May 30, 2023

(65) Prior Publication Data

US 2024/0304000 A1  Sep. 12, 2024

(30) Foreign Application Priority Data

Mar. 8, 2023 (TW) ................. 112108457

(51) Int. Cl.
| | | |
|---|---|---|
| G06V 20/58 | (2022.01) | |
| G06T 7/50 | (2017.01) | |
| G06V 10/26 | (2022.01) | |
| G06V 10/40 | (2022.01) | |
| G06V 10/764 | (2022.01) | |
| G06V 10/77 | (2022.01) | |
| G06V 10/774 | (2022.01) | |
| G06V 10/82 | (2022.01) | |

(52) U.S. Cl.
CPC ............ G06V 20/58 (2022.01); G06T 7/50 (2017.01); G06V 10/26 (2022.01); G06V 10/40 (2022.01); G06V 10/764 (2022.01); G06V 10/7715 (2022.01); G06V 10/774 (2022.01); *G06T 2207/30261* (2013.01)

(58) Field of Classification Search
USPC ........................................ 382/103, 156, 159
See application file for complete search history.

(56) References Cited

U.S. PATENT DOCUMENTS

| | | | | |
|---|---|---|---|---|
| 10,438,371 | B2* | 10/2019 | Xu | G06V 10/454 |
| 11,538,185 | B2* | 12/2022 | Kaiser | G01C 21/3837 |
| 12,039,788 | B2* | 7/2024 | Guo | G06T 7/143 |
| 12,051,206 | B2* | 7/2024 | Chen | G06T 7/10 |
| 2020/0293751 | A1* | 9/2020 | Zeng | G01C 21/20 |
| 2021/0110174 | A1* | 4/2021 | Ohgushi | G06V 10/82 |
| 2021/0146952 | A1* | 5/2021 | Vora | G06V 20/58 |
| 2021/0350705 | A1* | 11/2021 | Guo | G05D 1/0221 |

OTHER PUBLICATIONS

Liu et al., Vision Based Environmental Perception for Autonomous Driving, arXiv2212-11453 [[cs.CV], pp. 1-39. (Year: 2022).*
Ramos et al., Detecting Unexpected Obstacles for Self-Driving Cars: Fusing Deep Learning and Geometric Modeling, IEEE 978-15090-4804-5/17, IEEE Intelligent Vehicle Symposium, Jun. 11-14, 2017, Redondo Beach, pp. 1025-1032. (Year: 2017).*

* cited by examiner

*Primary Examiner* — Ishrat I Sherali
(74) *Attorney, Agent, or Firm* — BACON & THOMAS, PLLC

(57) ABSTRACT

The invention provides a system for detecting obstacle state and an operating method thereof, comprising an image capturing module, a semantic segmentation module, a feature extraction module, an object detection module, and a distance table calibration module. The invention is delivered a semantic segmentation information to a model for processing self-learning, and selected an output of an original image size, for a carrier of an attention mechanism.

7 Claims, 5 Drawing Sheets

Probability classification map T1

| Pixel points | p1 | p2 | p3 | p4 | p5 | p6 | ...... |
|---|---|---|---|---|---|---|---|
| C Car | 0.5 | 0.8 | 0.6 | 0.7 | 0.6 | 0.8 | ...... |
| L Lane marking | 0.2 | 0.1 | 0.2 | 0.1 | 0.3 | 0.2 | ...... |
| R Lane | 0.3 | 0.1 | 0.2 | 0.3 | 0.1 | 0 | ...... |

Figure 3A

Probability distribution map T2

| p1 | p2 | p3 | p4 | p5 | p6 |
|----|----|----|----|----|----|
| C  | C  | C  | C  | C  | C  |

Figure 3B

SYSTEM FOR DETECTING OBSTACLE STATE AND AN OPERATION METHOD THEREOF

BACKGROUND OF THE INVENTION

1. Field of the Invention

The present invention relates to a system for detecting obstacle state and an operation method thereof, particularly to a system for detecting obstacle state and an operation method thereof by using the attention technique with deep learning.

2. Description of the Prior Art

The panoptic driving perception system is quite emphasized in the field of past panoptic driving perception system, because the visual information from the images captured by cameras can be extracted by the panoptic driving perception system, so that the panoptic driving perception system is enabled of the panoptic driving perception system to perform the object detection on the road, the vehicle is allowed to avoid obstacles and comply with traffic rules while driving on the road. Therefore, the panoptic driving perception system is played as a significant role in the development of the autonomous driving technology, and is assisted to the decision system of the autonomous driving technology to effectively be controlled the vehicle.

In the conventional technology, to limit the action of the vehicle, the panoptic driving perception system must be understood the scene and provided information to the decision system. When the panoptic driving perception system is manually controlled and feature maps are processed to deem as useful, although the convergence speed will be quite fast, there are still some information which is considered as useless.

The current attention mechanism computation method can be applied to the field of the panoptic driving perception system, and which is belonged to the imitation cognition attention techniques the of artificial neural networks field. In the past, the attention mechanism would be chosen to use the lower-level feature maps in order to perform the attention mechanism computation to avoid additional computation, but for lightweight models with small input image sizes, the computation effect cannot be significantly improved.

Therefore, the industry and supply chain related to the vehicle field are looking forward to be developed a panoptic driving perception system that can be detected to the state of obstacles and can be applied to the field of vehicle autonomous driving technology, in order to be provided effective autonomous driving functions and significantly improved vehicle driving safety.

SUMMARY OF THE INVENTION

The present invention relates to a system for detecting obstacle state and an operation method thereof, which is delivered semantic segmentation information to a model for processing self-learning, and is selected an output of an original image size, for the carrier of the attention mechanism.

The present invention relates to a system for detecting obstacle state and an operation method thereof, particularly a system for detecting obstacle state and an operation method thereof by using deep learning attention technology, which is through by the output of the semantic segmentation sub-network, the input of the object detection sub-network is merged with the information for the output of the semantic segmentation sub-network.

The present invention relates to a system for detecting obstacle state and an operation method thereof, the object detection sub-network is allowed to determine how to learn the necessary information.

The main purpose of the present invention is provided for a system for detecting obstacle state, comprising: an image capturing module for capturing images by a fixed frequency, comprising a road information; a semantic segmentation module for calculating an image and outputting the probability classification map of road information based on a feature data; a feature extraction module for extracting the feature data of the road information, outputting image information and probability distribution map; an object detection module for training the object detection model by using the image, the feature data, the image information, and the road information; and, a distance table calibration module for calculating and storing the distance value represented by each pixel in the image using distance measurement algorithm method, wherein, directly query the distance table for the pixel of the image to obtain the distance value.

One of the purpose for a system for detecting obstacle state of the present invention, the feature extraction module is used, and by means of the image information of the semantic segmentation module, and the probability distribution map, after through extracting and selecting features of the probability classification map, the image information is changed, and the size of the probability distribution map is changed to be the same as the size of the image, and processes an output.

One of the purpose for a system for detecting obstacle state and an operation method thereof for the present invention, the feature extraction module is used to perform calculation processing by "softmax calculation method" on the image information and the probability distribution map, the information standardization is processed between 0 and 1 to achieve consistency with the input level of the object detection model.

One of the purpose for a system for detecting obstacle state and an operation method thereof for the present invention, the object detection module is used to merge the probability distribution map output by using the feature extraction module and the image as an input for training.

One of the purpose for a system for detecting obstacle state and an operation method thereof for the present invention, the road surface level is set in the distance table calibration module, and a measuring tool is used in advance to record the actual distance of a point, and the pixel at the position is marked, the different algorithm methods is used, a distance table of the same size is calibrated and created as the image of the image capture module, the distance value of any pixel point can be obtained by querying the distance table.

One of the advantages for a system for detecting obstacle state and an operation method thereof for the present invention, which is belonged to the field of attention mechanisms in deep learning, the output of the semantic segmentation sub-network in the neural network is used to enhance the accuracy of the object detection sub-network.

One of the advantages for a system for detecting obstacle state and an operation method thereof for the present invention, almost there is no need to be increased the amount of calculation, but the present invention additionally enhances the accuracy of object detection.

One of the advantages of the present invention, which is a system for detecting obstacle state and an operation method thereof, in terms of computational complexity, because only the size of the first convolutional layer of the object detection sub-network is modified, the network structure is remained unchanged, so that the computational complexity can be greatly increased, and a significantly greater accuracy can be achieved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3A shows a probability classification chart T1 of a system for detecting obstacle state and an operation method thereof of the present invention.

FIG. 3B shows a probability distribution chart T2 of a system for detecting obstacle state and an operation method thereof of the present invention.

DESCRIPTION OF THE PREFERRED EMBODIMENT

Figure 1:
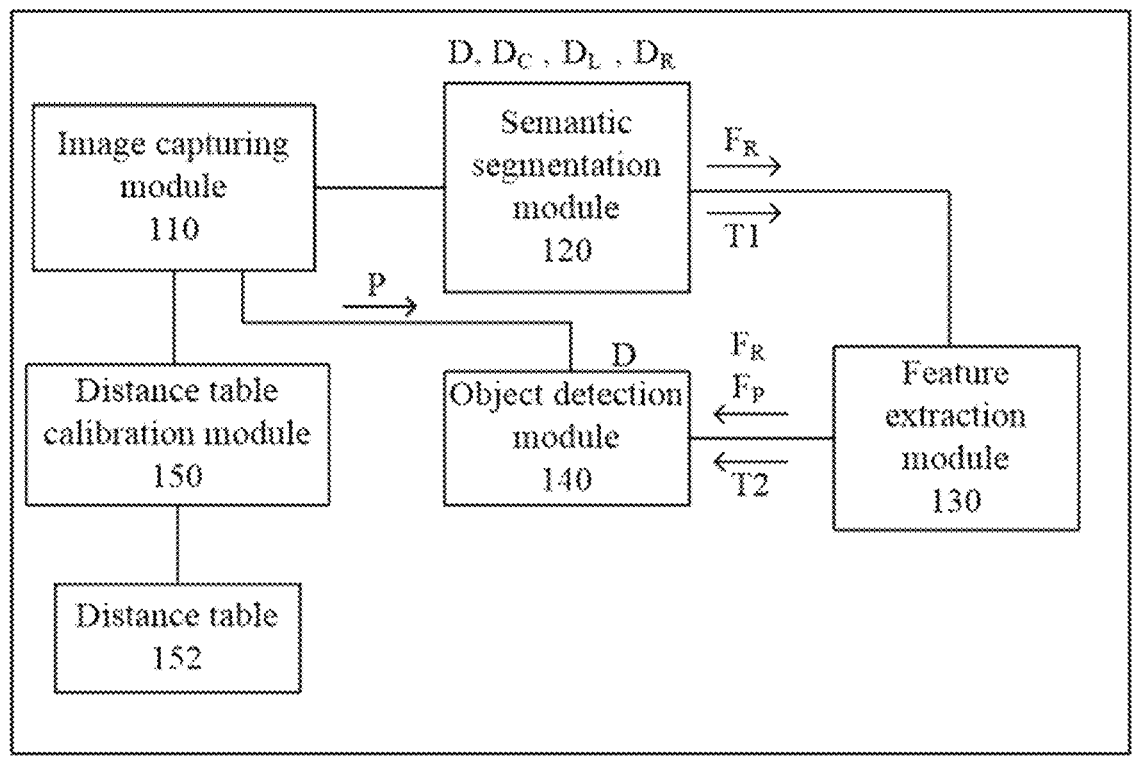
FIG. 1 shows a schematic diagram for detecting obstacle state of a system for detecting obstacle state and an operation method thereof of the present invention.

Please refer to FIG. 1 shows a schematic diagram for detecting obstacle state of a system for detecting obstacle state and an operation method thereof of the present invention, wherein the system for detecting obstacle state 100 comprises an image capturing module 110, a semantic segmentation module 120, a feature extraction module 130, an object detection module 140, a distance table calibration module 150, and a distance table 152.

Figure 2:
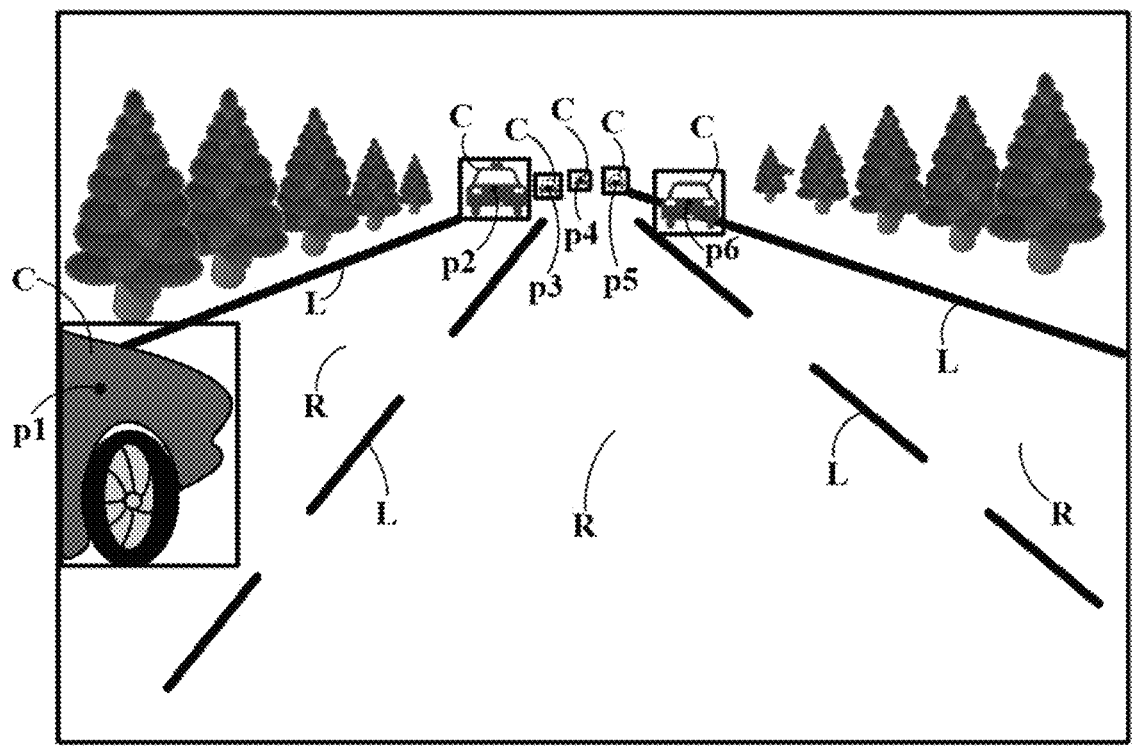
FIG. 2 shows an image schematic diagram of a system for detecting obstacle state and an operation method thereof of the present invention.

Please refer to FIG. 1 shows a schematic diagram for detecting obstacle state of a system for detecting obstacle state and an operation method thereof of the present invention, wherein the function of the image capturing module 110 is used to capture an image P by a fixed frequency, which comprises road information $F_R$. Please also refer to FIG. 2 showing an image schematic diagram of a system for detecting obstacle state and an operation method thereof for the present invention, wherein the road information $F_R$ (displayed in FIG. 1) comprises a car C (where C represents the symbol for a car (CAR), as shown in FIG. 2), a lane markings L (shown in FIG. 2), and a lane R (shown in FIG. 2), and so on.

Please also refer to FIG. 1 shows a schematic diagram for detecting obstacle state of a system for detecting obstacle state and an operation method thereof for the present invention. FIG. 3A shows a probability classification chart T1 of a system for detecting obstacle state and an operation method thereof for the present invention, and FIG. 3B shows a probability distribution chart T2 of a system for detecting obstacle state and an operation method thereof for the present invention. The function of the semantic segmentation module 120 shown in FIG. 1 is to calculate the image P (shown in FIG. 1) and output the probability classification map T1 (FIG. 3A) of the road information $F_R$ (shown in FIG. 1) based on the feature data D (in FIG. 1). The aforementioned feature data D (shown in FIG. 1) comprises car feature data $D_C$ (shown in FIG. 1), lane marking feature data $D_L$ (shown in FIG. 1), lane feature data $D_R$ (shown in FIG. 1), and so on. By using the semantic segmentation module 120 (shown in FIG. 1) based on the feature data D (including car feature data $D_C$, lane marking feature data $D_L$, lane feature data $D_R$), determining the individual probabilities of each pixel point for cars, lane markings, and lanes. It should be noted that the probability classification map T1 (shown in FIG. 3A) mentioned above is only explained by using a few pixels as an example. Therefore, the probability classification map T1 (shown in FIG. 3A) of the present invention comprises the probabilities of all pixel points in the image P (shown in FIG. 1). For example, the probabilities of pixel points p1, p2, p3, p4, p5, and p6 in the probability classification map T1 (shown in FIG. 3A) are all higher for cars. In addition, the meaning of car C, which represents the symbol for a car (CAR), shown in FIG. 3A, and also explained.

Please refer to FIG. 1 shows a schematic diagram for detecting obstacle state of a system for detecting obstacle state and an operation method thereof for the present invention, wherein the function of the feature extraction module 130 is used to extract the feature data D (comprising the car feature data $D_C$, lane feature data $D_L$, and lane feature data $D_R$) of the road information $F_R$ and output the image information $F_P$, and as the probability distribution map T2 shown in FIG. 3B. In addition, the meaning of the car C, C represents the symbol of the car (CAR), as shown in FIG. 3B.

In the probability distribution map T2 of FIG. 3B, the probabilities of pixels p1, p2, p3, p4, p5, and p6 are marked as cars. The feature extraction module 130 (shown in FIG. 1) uses the image information $F_P$ (shown in FIG. 1) of the semantic segmentation module 120 (shown in FIG. 1), and the probability distribution map T2 (shown in FIG. 3B), after extracting and selecting the features of the probability distribution graph T2 (shown in FIG. 3B), the image information $F_P$ (shown in FIG. 1) is modified and the size of the probability distribution map T2 (shown in FIG. 3B) is the same as the size of the image P (shown in FIG. 1), and is output. It should be noted that the feature extraction module 130 (shown in FIG. 1) treats the picture information $F_P$ (shown in FIG. 1) and the probability distribution map T2 (shown in FIG. 3B) by using the "softmax calculation method", the feature map information is changed, and the processing information is normalized between 0 and 1, in order to make the consistent with the input level of the object detection model. The feature map information refers to the $D_C$ car feature (shown in FIG. 1) data, and the feature map of the part is needed to be strengthened can be inputted, usually, the features is needed to be enhanced are cars, pedestrians and bicycles, therefore, the feature maps of cars, pedestrians, and bicycles will be processed, and then, into the object detection module 140 (shown in FIG. 1) for training. The lane-related information obtained by processing semantic segmentation using the semantic segmentation module 120 (shown in FIG. 1) can be directly used for outputting, without being sent to the object detection module 140 for training.

Continually, refer to FIG. 1 shows a schematic diagram for detecting obstacle state of a system for detecting obstacle state and an operation method thereof for the present invention, wherein the function of the object detection module 140 is to use the image P, the feature data D, the image information $F_P$, and the road information $F_R$ for training the object detection module 140.

Please refer to FIG. 1 shows a schematic diagram for detecting obstacle state of a system for detecting obstacle state and an operation method thereof for the present invention, wherein the function of the distance table calibration module 150 is used to the detecting-range algorithm method, in order to calculate and store a distance value represented by each pixel point p in the image P, wherein, the distance table is directly queried for the pixel point p of the image P, and the distance value can be obtained.

Figure 4:
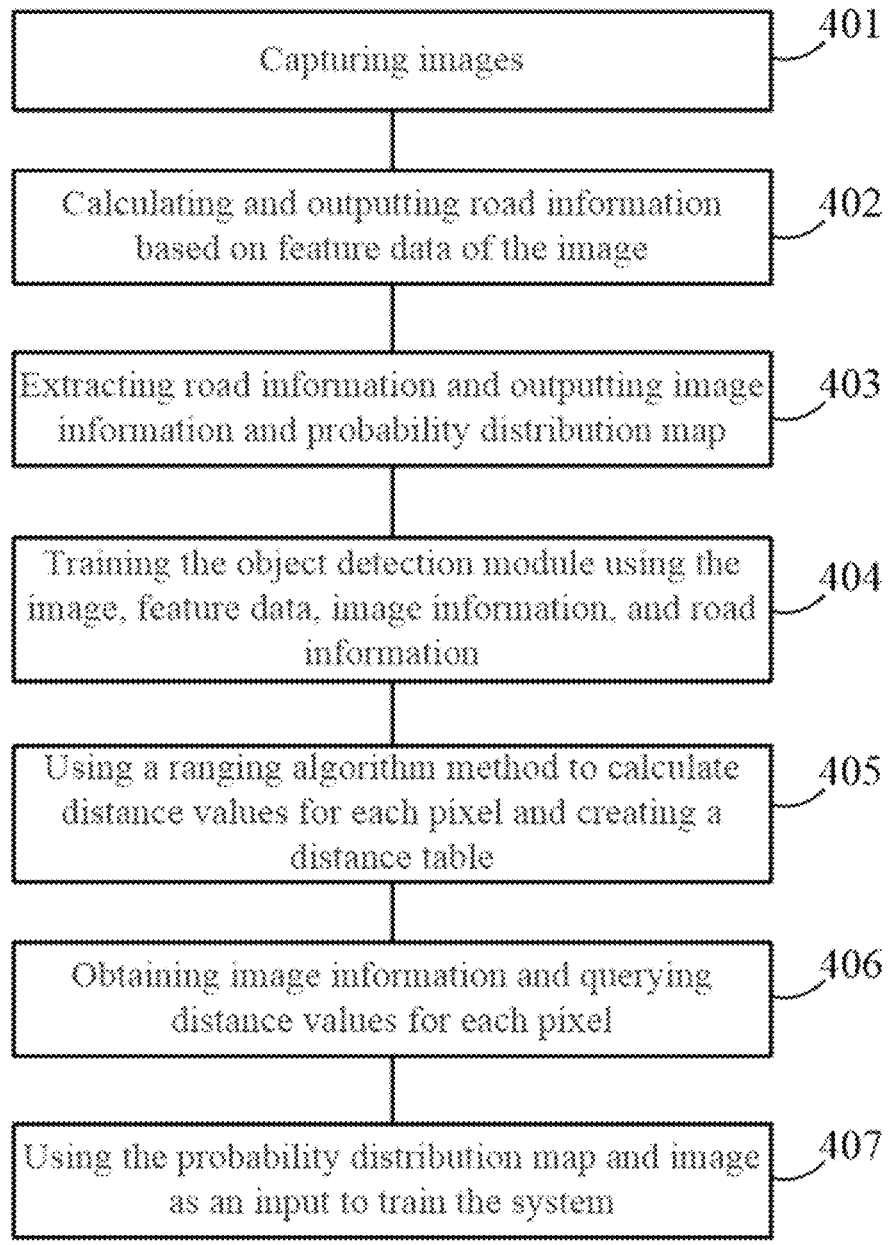
FIG. 4 shows a flowchart of the operation method for detecting obstacle state of a system for detecting obstacle state and an operation method thereof of the present invention.

Please refer to FIG. 1 shows a schematic diagram for detecting obstacle state of a system for detecting obstacle state and an operation method thereof for the present invention, and FIG. 2 shows an image schematic diagram of a system for detecting obstacle state and an operation method thereof for the present invention. The function of the distance table calibration module 150 in FIG. 1 is set to the level of the road surface, and the measuring tool is used in advance to record the actual distance of a point position, and the pixel at the position is marked, and different calculation methods are used to be corrected, and a distance table 152 of the same size is established as the image of the image capture module 110, providing by directly inquiring the distance table 152, the distance value of any pixel point p can be known. For example, pixel points p1, p2, p3, p4, p5, and p6 can respectively be queried by the distance table 152 to obtain the distance value of each pixel point Still please also refer to FIG. 1 shows a schematic diagram for detecting obstacle state of a system for detecting obstacle state and an operation method thereof for the present invention, and FIG. 4 shows a flowchart of the operation method for detecting obstacle state of a system for detecting obstacle state and an operation method thereof for the present invention, which comprises the following steps:

FIG. 4 shows a flowchart of the operation method for detecting obstacle state of a system for detecting obstacle state and an operation method thereof for the present invention, Step 401 of FIG. 4 is used to capture an image P at a fixed frequency. The image P contains road information, and the road information includes images such as car C (the CAR is represented by C), marking line L, lane R, etc. . . .

FIG. 4 shows a flowchart of the operation method for detecting obstacle state of a system for detecting obstacle state and an operation method thereof for the present invention, Step 401 of FIG. 4 is used to calculate the image P and output the probability classification map T1 of the road information FR based on a feature data D. As shown in FIG. 1 for a schematic diagram for a system for detecting obstacle state and an operation method thereof for the present invention, and shown in the probability classification diagram of the present invention in FIG. 3A, the aforementioned feature data D includes: car feature data $D_C$, marking line feature data $D_L$, and lane feature data DR, therefore, according to the characteristic data D, the individual possible probability of each pixel point for cars, marking lines, and lanes can be judged. It should be noted that the aforementioned probability classification map T1 is only an example of some pixels for illustration, and the probability classification map of the present invention includes the probability of all pixels in the image P.

FIG. 4 shows a flowchart of the operation method for detecting obstacle state of a system for detecting obstacle state and an operation method thereof for the present invention, Step 403 of FIG. 4 is used to extract feature data D of the road information $F_R$ (including vehicle feature data $D_C$, lane marking feature data $D_L$, and lane feature data $D_R$, etc.), and outputs a picture information $F_P$, and a probability distribution map T2 is output. The feature extraction module 130 uses the image information $F_P$ of the semantic segmentation module 120 and the probability distribution map T2, after extracting and selecting the features of the probability distribution map T2, the picture information $F_P$ and the size of the probability distribution map T2 are changed, which is the same size as the image P and is output.

FIG. 4 shows a flowchart of the operation method for detecting obstacle state of a system for detecting obstacle state and an operation method thereof for the present invention, in Step 404 of FIG. 4, by using the image P, feature data D, picture information $F_P$, and road information $F_R$, an object detection module 140 is trained.

FIG. 4 shows a flowchart of the operation method for detecting obstacle state of a system for detecting obstacle state and an operation method thereof for the present invention, in Step 405 of FIG. 4, by using a detecting distance algorithm method to calculate and store a distance value represented by each pixel in the image P, in order to establish a distance table 152.

FIG. 4 shows a flowchart of the operation method for detecting obstacle state of a system for detecting obstacle state and an operation method thereof for the present invention, in Step 406 of FIG. 4, the picture information $F_P$ is obtained, the distance table 152 is queried, a pixel distance value in the picture information $F_P$ is obtained.

FIG. 4 shows a flowchart of the operation method for detecting obstacle state of a system for detecting obstacle state and an operation method thereof for the present invention, in Step 407 of FIG. 4, the probability distribution map T2 and the image P is used to be combined with together and is inputted for training.

A system for detecting obstacle state and an operation method thereof for the present invention, which is in the field of attention mechanism in deep learning, the output of the semantic segmentation sub-network in the neural network is used to enhance the accuracy of the object detection sub-network. Furthermore, a system for detecting obstacle state and an operation method thereof for the present invention, almost there is no need to be increased the amount of calculation, but the invention can additionally be enhanced the accuracy of object detection. Moreover, a system for detecting obstacle state and an operation method thereof for the present invention, to the calculation part, because only the size of the first layer convolution of the object detection sub-network is corrected, the network type will not be changed, the amount of calculation can be greatly improved, so that and the accuracy can be significantly improved.

In summary, the developed for a system for detecting obstacle state and an operation method thereof for the present invention, to the related vehicle industry and supply chain, which is fully meets the requirements of a panoramic driving perception system capable of detecting obstacle state. The invention can also be applied to the field of vehicle automatic assistant driving technology, sufficient to be provided effective automatic driving assistant functions and significantly enhanced driving safety.

The above description is only a preferred embodiment of the present invention, and is not intended to limit the scope of the patent claim. Equivalent changes or modifications made within the spirit of the present invention shall be included in the scope of the following patent claim.

What is claimed is:

1. A system for detecting obstacle state, comprising:
an image capturing module, capturing an image at a fixed frequency, an image comprises a road information;
a semantic segmentation module, calculating an image and outputting a probability classification map of the road information based on a feature data;
a feature extraction module, extracting the feature data of the road information, and outputting an image information, and a probability distribution map;
an object detection module, training the object detection module by using the image, the feature data, the image information, and the road information; and
a distance table calibration module, using a distance measurement algorithm method to calculate and store a distance value for each pixel in the image, and directly querying a distance table for a distance value of each pixel in the image.

2. The system for detecting obstacle state according to claim 1, wherein a function of a feature extraction module comprises based on an image information of a semantic segmentation module and a probability distribution map, after through extracting and selecting features of the probability classification map, changes the image information, and a size of the probability distribution map to be the same as the size of the image, and being output.

3. The system for detecting obstacle state according to claim 1, wherein a function of a feature extraction module comprising treats an image information and a probability distribution map by using a softmax calculation method, in order to change a feature map information, and an information is normalized to between 0 and 1.

4. The system for detecting obstacle state according to claim 1, further comprising a function of an object detection module being using a probability distribution map output by a feature extraction module and the image being merged with as an input for training.

5. The system for detecting obstacle state according to claim 1, wherein a distance table calibration module comprising sets a road surface level in a distance table calibration module, and using a measuring tool in advance to record an actual distance of a point, and marking a pixel at a position, using a different algorithm method, calibrating and creating a distance table of a same size as an image of an image capturing module, a distance value of any pixel point being obtained by querying the distance table.

6. A method for detecting obstacle state operation, comprising:
capturing respectively an image at a fixed frequency;
calculating an image and outputting a probability classification map of road information based on a feature data;
extracting a feature data of the road information and outputting an image information, and a probability distribution map;
training an object detection module by using the image, the feature data, the image information, and the road information;
calculating and storing a distance value for each pixel in the image using a ranging algorithm method to establish a distance table; and
obtaining the image information, and querying the distance table to determine the distance value represented by a pixel in the image.

7. The system for detecting obstacle state according to claim 1, further comprising merging a probability distribution map and an image as an input for training.

* * * * *